Nov. 12, 1940.　　　　　M. OMANSKY　　　　　2,221,431
STRUCTURAL MATERIAL
Filed Jan. 17, 1936
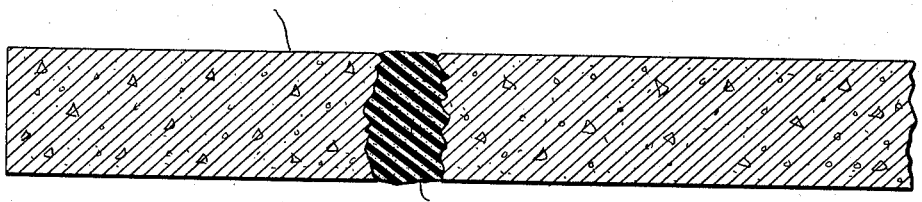
Inventor
Morris Omansky
Ezekiel Wolf
Atty Patented Nov. 12, 1940

2,221,431

UNITED STATES PATENT OFFICE 2,221,431

STRUCTURAL MATERIAL

Morris Omansky, Brookline, Mass., assignor to Para-Bond Corporation of America, Boston, Mass.

Application January 17, 1936, Serial No. 59,551

2 Claims. (Cl. 94—18)

The present invention relates to a method of preparing rubber compound which has a latex base or a base of milk of rubber and to the means itself which is applicable for use in a great number of arts.

In particular the invention finds application in the construction of building, road laying, binders, waterproofing, acoustic insulation and many other kindred purposes.

In particular the present invention may employ with a base of latex a vulcanized rubber compound or other suitable mixtures and fillers and may be used for cementing purposes in any type of construction and in particular in road construction for cementing or bonding concrete slabs or pavements together.

The present invention will be more clearly understood in connection with the specification below, describing the invention and the drawing illustrating an embodiment of the invention in which the figure shows a section of the structure in accordance with the invention.

As illustrated in the drawing primarily there is a direct bonding of the joint material to the concrete blocks. The amount of casein used in the latex and the filler compound is not sufficient to destroy the elasticity of the rubber contents of the latex, but sufficient to prevent coagulation thereof until the latex has penetrated into the concrete so that a direct bonding between the joint and the concrete is obtained.

In previous compounds which have been unsuccessfully used for this purpose, it has been considered essential to use highly concentrated latex having a total solid content of over 70% by weight and stabilized by the use of soaps and caustic alkalies. The use of soaps and caustic alkalies have been for the purpose of preventing premature coagulation maintaining stability and the high concentration for preventing the formation of cracks when drying.

The difficulties encountered with compounds of this type have been many and have prevented the compound from being used in general in a commercial manner. In such a compound where a large part of the constituents are solid particles, it makes it difficult to add any large quantity of filler or other cheaper material, and therefore the relative quantity of such a compound to the allowable amount of filler that can be used with it is comparatively high, that is to say, a very large amount of compound is necessary and very little filler can be added. Since the latex compound is comparatively expensive, the cost of the mixture when put on the road or used as a compound is still comparatively expensive and in fact too expensive for ordinary commercial use. Further the compound formed with heavy latex content is of rather viscous consistency which varies somewhat with the temperature and atmospheric conditions. On ordinary days it is like a heavy cream, whereas on colder days it becomes thicker and too viscous.

In the ordinary use of such materials, it is mixed when it is applied with solid fillers, among which cork and bark or the like have been used. After mixing with such fillers, it is usually applied to fill the place where the joint is to be made and is allowed to set and become hard. Where the latex compound already is considerably solid material, only a very small volume of filler is possible and further setting or hardening takes place so rapidly that there is hardly time for the material to be properly applied. Due also to the high solid contents in the latex mixture this time of setting is quite definitely fixed for a very short period and with the addition of any solid fillers at all as is always desirable to make a proper bulk and cut down the cost, it is practically impossible to lengthen the time of setting. Further the use of free caustics provide a hazard to the workmen, since serious burns may be inflicted if this material comes in contact with the individual. This of course is particularly dangerous to the eyes and skin and unless precautions are taken to prevent splashing of the compound when the mixing takes place, such injury may easily occur.

It will also be noted that since the latex compound contains a high percentage of solid materials, that is colloidal rubber for the most part, the material is basically quite expensive since the cost is controlled to a very great degree upon the amount of solid substance in the latex.

In the present invention a less concentrated and therefore cheaper latex may be used and in addition this will go farther than the latex used in previous compounds, because of its greater absorption of solid materials.

In the present invention I have discovered that by following a different principle of formulation that the high concentration of solid substance in the latex which was previously believed to be necessary can be dispensed with and by the use of certain other materials in formulating the compound, not only is it possible to create a firmer bonding rubber but also it is possible to do this at a lower cost without using the hazardous substances that may be injurious to the workmen.

In the present invention the distinction must be followed between the solid contents of the latex material itself which is for the most part colloidal rubber in suspension and solid particles of larger size. The solid material in the latex compound is in particles of molecular magnitude and remains in suspension by virtue of the soaps and caustic potash that were added to stabilize the compound. These solids in the prior art have usually been no less than 70% to 75% of the total weight. As contrasted with this the particles in the present invention which are added as fillers and may be ground rubber or the like are particles of visible dimensions and are therefore of a different order of magnitude than the molecular-like particles in the previous latex compound.

In the present invention I use as a base a latex of solid concentration, that is, a concentration comprising colloidal particles of less than 70% by weight of the compound. I have used to good advantage latex compounds containing a concentration of solid materials of percentages ranging from 20% to 60%, with extremely good results.

As in the case of the prior art, to the latex compound there is added just before placing in permanent location, a certain amount of fillers. For the purpose of making the material set properly when in place, there may be employed Portland cement and zinc oxide, and for purposes of vulcanization, sulphur and some organic accelerator like the zinc salts of dithiocarbamates and their derivatives, piperidine, pentamethylene dithiocarbamate, or any other accelerator which can effect vulcanization at room temperatures.

I have also discovered that by the use of casein and similar neutral and active adhesives as a protective colloid in proportions over 1% by weight of the rubber present in the latex that I can obtain better protection against premature coagulation. The proportion of casein used varies with the quantities and nature of the filler but I have not found it necessary to exceed 20% of casein based upon the rubber content of the latex. Moreover, I have found that the use of adequate proportions of casein render the use of caustic alkali unnecessary and render a concentration of 0.5 N ammonia sufficient for preservative action. I thereby eliminate soap and caustic alkali which are both water-soluble and undesirably reactive with Portland cement and other silicates. I have also discovered that by the use of casein in place of soap and caustic alkali that my final mixture forms not only a much stronger bond to the structure, but that it permits the elimination of the priming coat which has hitherto been considered essential. If it is desired a small amount of soft non-caustic soaps may be used along with the casein, but such soaps are not essential where the casein is used. While I prefer to use casein, other similar substances may be used, as for instance, glue albumen or substances of the like nature.

In the prior art reduced costs were obtained by the addition of gravel, bark, ground cork etc., as ingredients of the fillers. These produced a bulking effect only at a sacrifice in quality; even cork which is partly resilient under pressure is not as elastic as rubber and possesses no value as an extensible elastic medium. If the structural seams and joints merely contracted, materials like cork, fibres, etc., would be sufficient but where both contraction and expansion are present, it becomes evident that permanent defects are formed in the use of such materials.

I avoid this in the present invention by incorporating with the filler disintegrated rubber possessing a minimum elongation of 100% before break. By this means the bulking agent is elastic under expansion as well as contraction and the lower rubber content of a less concentrated latex is compensated for. I thus obtain a lower priced, less hazardous, more elastic and better bonding material.

It will be noted of course that the rubber filler is not necessary in all uses of the bonding material. Where a less elastic or expansible bond is permitted a filler other than disintegrated rubber may be added, and in fact various types of disintegrated rubber may be used, some of which are more elastic than others, dependent upon the nature of the work that the compound is required to do.

As an illustration I give the following example, but my invention is by no means limited to this formula. The latex and filler are prepared separately, as illustrated by the following proportions:

| Latex compound | Filler | |
|---|---|---|
| Parts by weight | | Parts by weight |
| 60% latex _____ 40 | Ground rubber___ | 30 |
| Casein _____ 4 | Portland cement _____ | 18 |
| Borax _____ 0.6 | Zinc oxide_____ | 1 |
| Water, with ammonia _____ 31.0 | Sulphur _____ | 0.7 |
| Piperidine, pentamethylene dithiocarbonate__ 0.12 | Anti-oxidant ____ | 0.7 |
| | Total_____ | 50.4 |
| Total_____ 75.72 | | |

The latex is the commercial variety preserved with ammonia. The casein is soaked for about thirty minutes with half the water. At the end of this period the borax is dissolved in the rest of the water and added to the swelled casein. The mixture is stirred and heated by steam or hot water applied externally, and enough ammonia added to make the mixture definitely alkaline to litmus test paper. The piperidine pentamethylene dithiocarbonate is then added and the whole stirred into the latex. The ground rubber and other ingredients in powdered form are mixed together by any suitable apparatus, such as a ball or a pebble mill, dough mixer, etc., until uniformity is attained. Both mixtures are kept separate until ready for use, when two parts of the filler by weight are stirred into three parts of the latex compound by weight until a uniform pasty mixture is obtained. This is placed and poured or tamped in place. This mixture first jells, then slowly dries and vulcanizes. Under normal conditions this action is reasonably completed in about two weeks' time.

It will be seen that the only alkalies I employ are borax and ammonia. Both are mild and free from the hazards of caustics. Moreover, the ammonia is completely lost by evaporation so that it cannot attack the concrete. The effect of the borax is negligible.

In addition to Portland cement I can add color pigments and other powders, such as clays, plaster, whiting etc. I can also change the kind and proportion of ground rubber depending upon the density of seam structure and extensibility desired. Thus, where a stretchy joint is desired, I employ ground inner tubes, rubber bands, the rubber from discarded automobile tires, etc.; for lesser degrees of flexibility I employ ground heel stock, mechanical rubber overflow, etc. The rapidity of jelling is controlled by the amount of Portland cement, zinc oxide and dehydrating powders; in general an increase in the proportion of these powders results in a more rapid setting after mixing. The rate of vulcanization is controlled by the kind and proportion of the ultra organic accelerator employed.

For making desirable acoustic purposes the ground rubber may be increased in quantity and should be ground very coarse so as to present a porous and uneven surface. For flooring and walls the ground rubber should be increased in quantity and should be very finely ground so as to obtain smoothness.

The latex compound may also be altered by the addition of other materials, such as gums, soaps, dyes, etc., to obtain differences in viscosity, stability and color. I can also change the concentration of the rubber in the latex by altering the proportion of water. The amount of casein may also be modified. The latex can also be used without ground rubber if low costs are not a consideration. Use of ground rubber as a substitute for the more expensive rubber of latex not only results in an economic saving, but also allows a type of bond to be produced that is most suitable for the purpose since if desired a much greater elasticity, extension and recovery may be provided with ordinary rubber as has been stated above. The treating and callendering of rubber tends to bring out these qualities which inherently remain the properties of the ground rubber particles, even though they may be surrounded by a latex compound. In this case the ground rubber particles stretch as they normally would, the latex more or less furnishing simply the binding of the particles together.

When used in road construction the joint is preferably of the order of ¼" to ¾" wide depending to a great extent upon the place where the road is laid and the size of the concrete slabs between the joints. With greatly varying weather conditions, a greater expansion and contraction of the concrete takes place, and under these conditions a large seam is desired. In the warm weather when the concrete expands, the seam rises slightly in the center to compensate for the volume decrease occasioned by the edges of the slab coming closer together. A vehicle riding over the concrete road rides over this slight and bulged projection without any noticeable effect since the material gives in all directions and is sufficiently elastic to hold without great resistance. In colder weather when the concrete contracts, the seam recovers and goes back to its normal place. The compound of the present invention readily adheres to the concrete base not only because of mechanical adhesion, but also because the crevices in the uneven concrete are readily and fully filled by the compound which flows freely, and because the compound after filling the crevices may further be tamped firmly in position. In application of the compound it may be provided in cans and it should be mixed with the filler in prescribed proportions just before its application to the road or to the joint that is to be made. It may be mixed in the ordinary vessels or containers in the manner that concrete or Portland cement is mixed without however any danger that occurs in the use of other materials having caustic elements. The setting time may be regulated by the special addition of setting materials or by the mixture of the compound with the filler itself, and the time of setting may readily be controlled dependent not only upon the work to be done, but upon weather conditions at the time the mixture is laid.

It is usually preferable to insure a substantial setting or coagulation before any change in the weather occurs, as for instance rain or mist, and if such change appears, aforesaid corresponding precautions should be taken to have the mixture set before the time such change occurs.

The present invention is applied not only to road construction in joining concrete slabs or the like, but may also be provided in building constructions both internally and externally, in fact the present compound when mixed with a rubber or other type of filler provides particularly good acoustic insulating properties and may therefore be used in interior finishing of auditoriums, halls or theatres where good acoustic properties are essential. The compound of the present invention may also be used in internal construction in floors of buildings, not only to provide a durable and resilient surface, but also to furnish a water-proof surface of durable qualities. It may also be noted that it serves its same function in its use in seams in road construction since it prevents moisture or water from seeping down beneath the concrete as often occurs in colder climates and frequently causes cracking or breaking of the concrete slabs. If the concrete itself is made waterproof, as most concrete slabs should, and the present compound is used between slabs, no chance of water seeping under the slabs is possible, and the surface therefore will remain intact and unbroken from the freezing of water beneath the concrete as often now occurs.

Having now described my invention, I claim:

1. In a road pavement having concrete blocks separately spaced, means forming an extensible, elastic, water-proof joint filling the space between the blocks and directly bonded to said blocks at the surfaces thereof, comprising a liquid mixture of latex having less than 60% concentration of rubber therein, filler material and amounts of casein in quantities less than 20% of the rubber contents in said latex, but sufficient to prevent too quick coagulation whereby direct bonding to said concrete blocks is provided when said mixture hardens subsequent to pouring.

2. A road pavement comprising in combination blocks of concrete separately spaced and means forming an extensible elastic waterproof joint filling the spaces between said blocks and directly bonded to said blocks at the edge surfaces thereof, said means comprising a 60% latex having a water content for the rest, a filler assisting in the dehydration of the latex when poured to form the joint and imparting cellular structure to the joint, and casein approximately in the amount of 10% of the latex, said amount not sufficient to destroy the elasticity of the rubber content of the latex but sufficient to prevent coagulation thereof until the latex has penetrated into the concrete whereby direct bonding between the joint and the concrete is obtained.

MORRIS OMANSKY.